United States Patent [19]

Fogelberg

[11] 4,044,870
[45] Aug. 30, 1977

[54] AUTOMATIC FOUR-WHEEL DRIVE TRANSFER CASE

[75] Inventor: Mark John Fogelberg, Muncie, Ind.

[73] Assignee: Borg-Warner Corporation, Chicago, Ill.

[21] Appl. No.: 615,001

[22] Filed: Sept. 19, 1975

[51] Int. Cl.² .............................................. F16D 13/44
[52] U.S. Cl. ................................ 192/89 W; 74/665 B; 192/48.9
[58] Field of Search ............. 180/44 R, 49; 192/30 R, 192/31, 32, 35, 36, 37, 38, 41 R, 41 A, 42, 43, 44, 45, 47, 114 R, 89 W; 74/665 B, 710, 10.5, 11

[56] References Cited

U.S. PATENT DOCUMENTS

| 2,096,438 | 10/1937 | Rockwell | 192/44 R |
|---|---|---|---|
| 2,399,201 | 2/1946 | Buckendale | 74/665 |
| 2,699,852 | 1/1955 | Cost | 192/46 |
| 2,796,941 | 6/1957 | Hill | 180/44 |
| 3,055,471 | 9/1962 | Warn | 192/36 |
| 3,119,480 | 1/1964 | Fuchs | 192/44 R |
| 3,221,574 | 12/1965 | Sampietro | 74/665 |
| 3,283,611 | 11/1966 | Weismann | 74/650 |
| 3,295,625 | 1/1967 | Odoriea | 180/44 R |
| 3,300,002 | 1/1967 | Roper | 192/55 |
| 3,463,279 | 8/1969 | Breisch | 192/89 W |
| 3,788,435 | 1/1974 | Prueter | 192/35 |

FOREIGN PATENT DOCUMENTS 899,607 France

*Primary Examiner*—Samuel Scott
*Assistant Examiner*—Frank H. McKenzie, Jr.
*Attorney, Agent, or Firm*—Julian Schachner

[57] ABSTRACT

A power transfer mechanism incorporated in a multiple path drive system comprising a transfer case disposed between a source of input torque and a pair of drive axles. Torque is transferred directly to one drive axle and is transferred automatically to the other drive axle through a double-acting overrunning clutch when required. The clutch is biased toward one engaged position, and is prevented from locking inadvertently in the other engaged position by a centrifugal blocking device.

9 Claims, 5 Drawing Figures

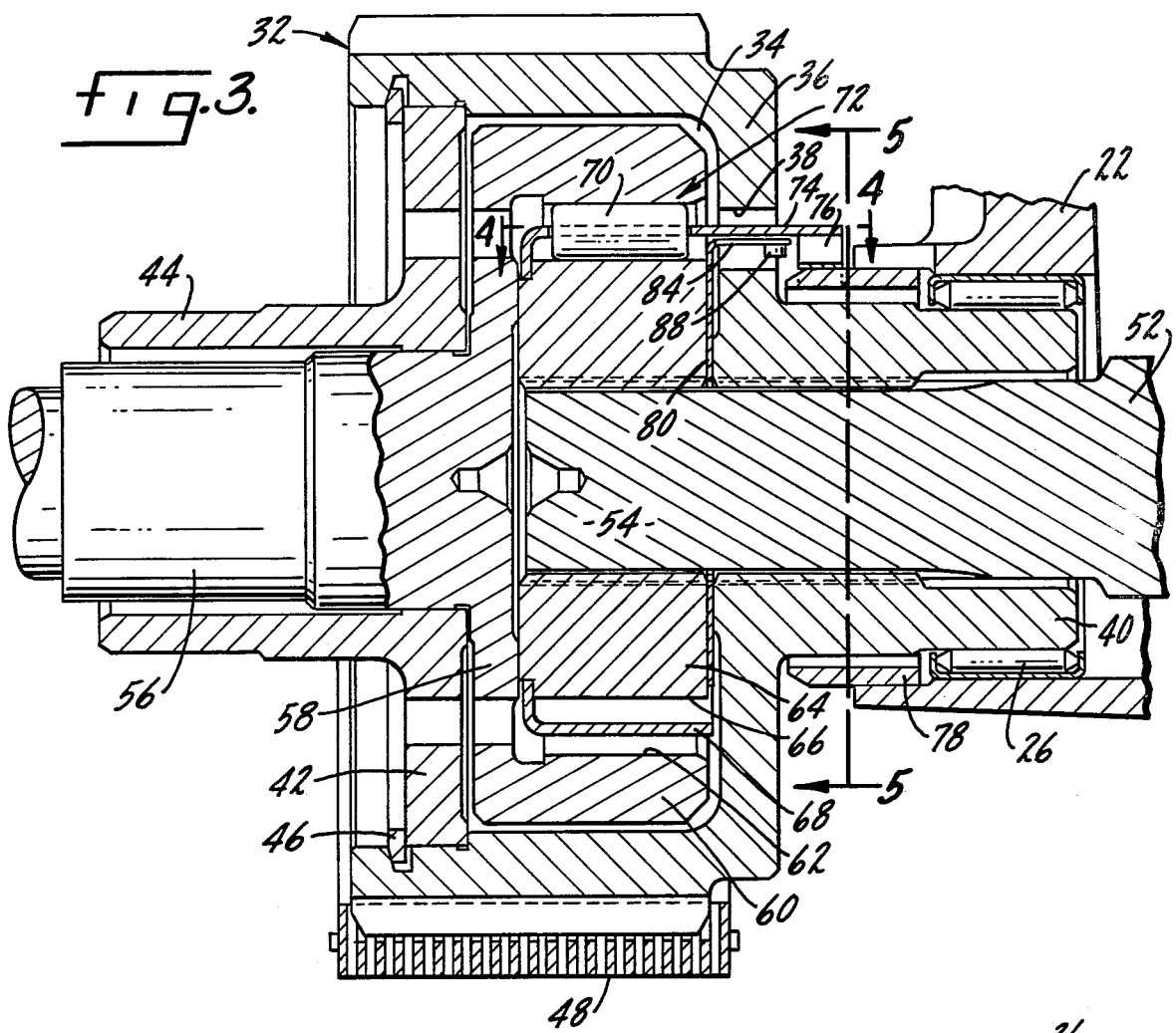
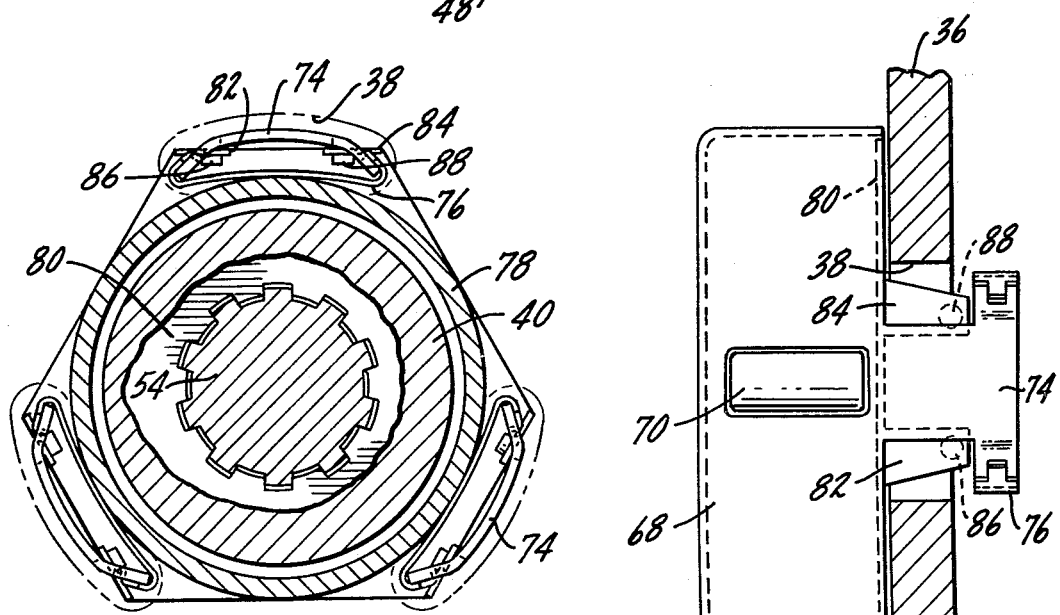

AUTOMATIC FOUR-WHEEL DRIVE TRANSFER CASE

BACKGROUND OF THE INVENTION

This invention relates generally to a power transfer mechanism adapted to be incorporated in a multiple path drive system, for example a four-wheel drive vehicle. More particularly, it relates to a torque transfer case adapted to receive torque from a prime mover and to provide torque for one drive axle where two-wheel drive is adequate, and to provide torque for both drive axles automatically where four-wheel drive is required. The torque transfer case incorporates a double-acting overrunning clutch responsive to relative rotation between the drive axles for automatically engaging where four-wheel drive is required.

In recent years there have been many improvements in automotive drive trains, including improvements relating to the transfer of torque from a prime mover to drive axles. Where four-wheel drive systems are used, transfer cases have been developed which generally provide torque transfer to one output to drive an axle and to another output for driving another axle. Some such transfer cases generally have included an overrunning mechanism which automatically engages and disengages the four-wheel drive function by biasing the cage of the mechanism to ground. However, there remains a need to provide an improved torque transfer case which engages and disengages automatically, but which prevents undesirable engagement should an excessive overrunning condition be encountered.

SUMMARY OF THE INVENTION

This invention is directed in brief to an improved four-wheel drive transfer case of the type having an overrunning device therein, and is intended for use between a prime mover and a pair of drive axles. The mechanism includes a transfer case adaptable for transferring torque from an input to one output directly and to another output through a double-acting overrunning clutch. The clutch includes a cage which is frictionally biased to provide a drag effect thereon, thus tending to engage the clutch. The arrangement is such that the output connected with the front axle normally rotates faster than the output connected with the rear axle. In this condition, the clutch tends to freewheel and no power is transmitted to the front axle. If the rear wheels lose traction in either direction of rotation, the rear output shaft will speed up until it rotates at the same speed as the front output shaft. The clutch then engages due to the frictional bias, and torque is transferred to the front output to drive the front axle as well as the rear axle. When traction is restored to the rear wheels, the clutch disengages and the system reverts back to a conventional two-wheel drive condition.

The front output includes an outer clutch race of cylindrical configuration. The rear output includes an inner clutch race having a plurality of ramp surfaces, each associated with a roller carried by a roller cage. Frictional bias for the roller cage is provided by drag shoes which rotate with the roller cage and are themselves adapted for frictional contact with the case housing.

Excessive overspeed of the normally overrunning clutch race may pull the rollers across the ramp surfaces, resulting in an undesirable locking condition. To guard against such undesirable clutch engagement, a blocking plate responsive to centrifugal force prevents roller movement through the freewheel position once normal operating speed has been attained.

Thus the requirements of various vehicle manufacturers for improved automatic four-wheel drive power trains may be satisfied with a simplified and economical assembly, as will be described.

BRIEF DESCRIPTION OF THE DRAWINGS

The objects and advantages of this invention will become apparent to those skilled in the art upon careful consideration of the specification herein, including the drawings, wherein:

FIG. 3 is an enlarged view of a portion of FIG. 1 showing details of the biasing mechanism and blocking device;

FIG. 4 is an enlarged sectional view taken along the line 4—4 of FIG. 3 showing additional details of the biasing mechanism and blocking device; and FIG. 5 is an enlarged sectional view taken along the line 5—5 of FIG. 3 showing additional details of the biasing mechanism and blocking device.

Figure 1:
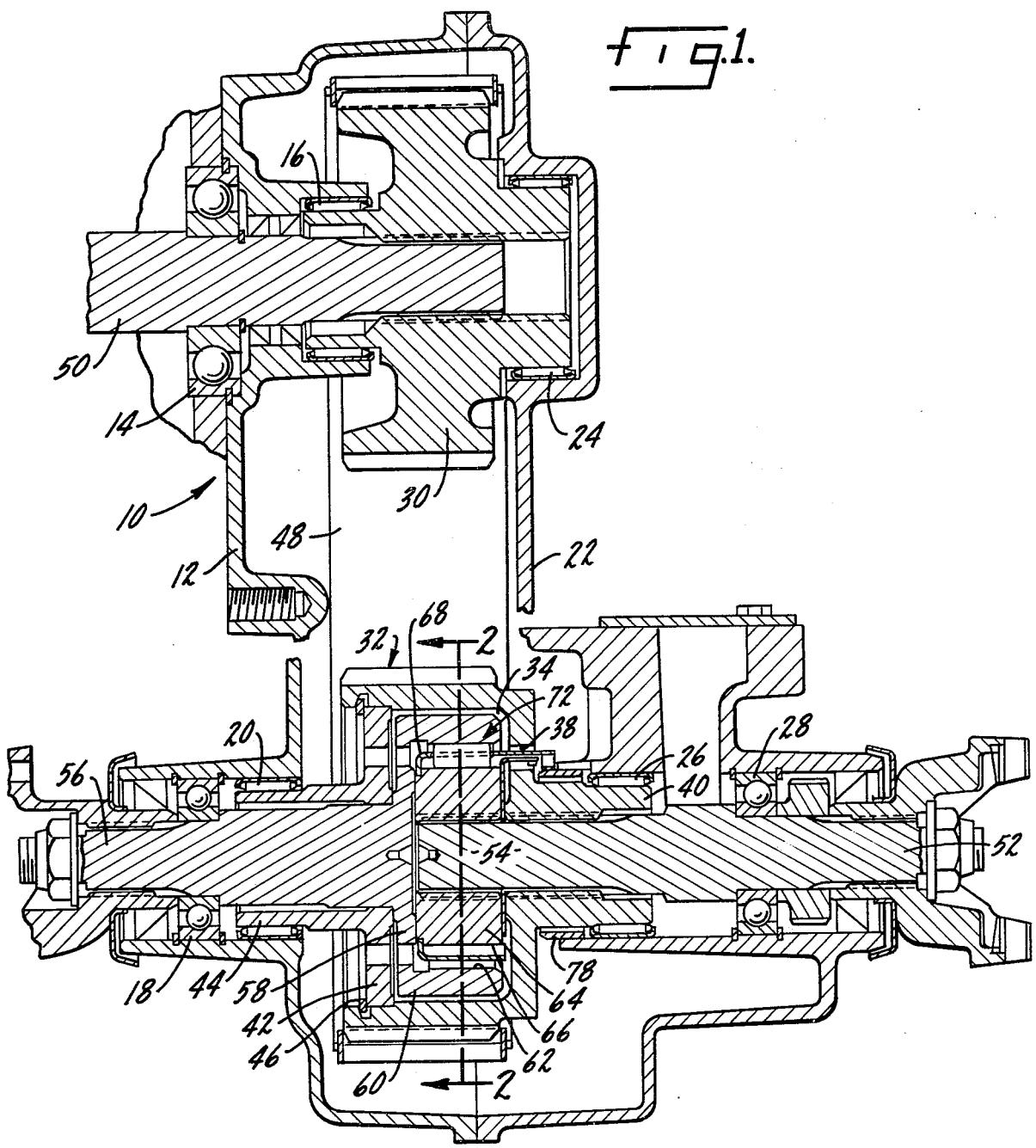
FIG. 1 is a sectional view showing the torque transfer case.

While this invention is susceptible of embodiment in many different forms, there is shown in the drawings and will herein be described in detail a preferred embodiment with the understanding that the present disclosure is to be considered as an exemplification of the principles of the invention and is not intended to limit the invention to this embodiment.

DESCRIPTION OF THE PREFERRED EMBODIMENT

Referring now to the drawings in greater detail, there is shown generally a torque transfer case 10 particularly adapted for use in an automotive vehicle incorporating a four-wheel drive system. Torque transfer case 10 is suitable for transmitting torque from a prime mover through a plurality of drive axle assemblies to drive front and rear pairs of traction wheels.

Torque transfer case 10 includes a first housing section 12 which supports bearings 14, 16, 18 and 20. Torque transfer case 10 also includes a second housing section 22 suitably secured to housing section 12. Bearings 24, 26 and 28 are supported by housing section 22.

A first sprocket 30 is journalled in bearings 16 and 24. A second sprocket 32 defines an interior pocket 34 and includes a flange 36 which in turn defines a plurality of openings 38 extending therethrough and spaced around its periphery to communicate pocket 34 with the exterior thereof. Sprocket 32 also includes an annular extension 40 extending outwardly from flange 36. Also forming a portion of sprocket 32 is a flange 42 having an annular extension 44 extending outwardly therefrom. Flange 42 is secured to sprocket 32 by means of a locking ring 46 or the like. Sprocket assembly 32 is journalled in bearings 20 and 26. A suitable chain 48 couples sprockets 30 and 32. Sprocket 30, chain 48 and sprocket 32 form a chain drive train.

An input shaft 50 is journalled in bearing 14 and extends into transfer case 10. Input shaft 50 is splined to sprocket 30, and is adapted to receive torque, for example, from an associated transmission of an automotive vehicle. It should be understood that input shaft 50 may be the output shaft of such a transmission.

A rear output or propeller shaft 52 is journalled in bearing 28 and extends into transfer case 10. Output shaft 52 is splined to extension 40 of sprocket 32 and defines an end portion 54 of reduced diameter.

A front output or propeller shaft 56 is journalled in bearing 18. Output shaft 56 extends into transfer case 10 and defines an upstanding flange 58 and an annular extension 60 within pocket 34 of sprocket 32. Extension 60 defines an outer clutch race 62 of cylindrical configuration.

An annular element or cam 64 is splined to end portion 54 of output shaft. Cam 64 is within pocket 34 and defines an inner clutch race 66 comprising a plurality of flats or ramp surfaces.

Wedging means comprises an annular cage 68 supporting a plurality of wedging elements 70, one of which is associated with each flat of inner race 66. Extension 60, cam 64, races 62 and 66, cage 68 and wedging elements 70 comprise together a double-acting overrunning clutch 72. In one preferred form of the invention, wedging elements 70 are rollers, and clutch 72 is a roller clutch.

Roller cage 68 defines a plurality of fingers 74 extending through openings 38 of sprocket 32. A plurality of spaced drag shoes 76 are carried by fingers 74. A wear ring 78 is press fit to housing section 22 for frictional contact by drag shoes 76, so as to establish smooth frictional engagement with housing section 22. Drag shoes 76 may be spring biased into frictional contact with wear ring 78. As a result, balanced radial forces are developed which cause a relative drag effect on roller cage 68.

A thin plate 80, preferably formed from spring steel or the like, is splined to end portion 54 of rear output shaft 52 for rotation therewith. Plate 80 thus is held in a predetermined angular relationship relative to cam 64. Plate 80 defines a plurality of pairs of spaced tabs 82 and 84 bent over to lie in the axial direction as shown in FIGS. 1 and 3. Tabs 82 and 84 are oriented relative to cage 68 such that in the position shown in FIG. 4 they are slightly overlapped by fingers 74 of cage 68. In this position, cage 68 is in its central or freewheel position, midway between the two clutch engaging positions. Tabs 82 and 84 are provided with weights 86 and 88, respectively.

Operation of transfer case 10 is as follows. Torque is received by input shaft 50 and is transferred through the chain drive train to drive output shaft 52. In one preferred form of the invention, output shaft 52 may be connected to a rear drive axle assembly of an associated vehicle. Output shaft 56 may be connected to the front drive axle assembly of an associated vehicle.

Output shaft 56 normally rotates faster than output shaft 52. This is inherent when the vehicle is turning, since the front wheels travel through a larger radius than do the rear wheels. For straight ahead movement, this may be accomplished by providing front and rear axles having slightly different gear ratios, front wheels slightly smaller than rear wheels, or by inflating the front tires to a pressure slightly less than that in the rear tires. Other suitable means may be provided for causing output shaft 56 normally to overrun output shaft 52.

Annular extension 60 rotates with output shaft 56. Cam 64 rotates with output shaft 52. Thus, outer race 62 rotates faster than inner race 66 under normal conditions. Roller cage 68 is rotated, and fingers 74 carry drag shoes 76. Due to the frictional engagement of drag shoes 76 with housing section 22, balanced radial forces are developed which result in a relative drag effect on roller cage 68. This relative drag effect is developed without any axial forces acting on roller cage 68, and thus there is no tendency for roller cage 68 to bind.

Figure 2:
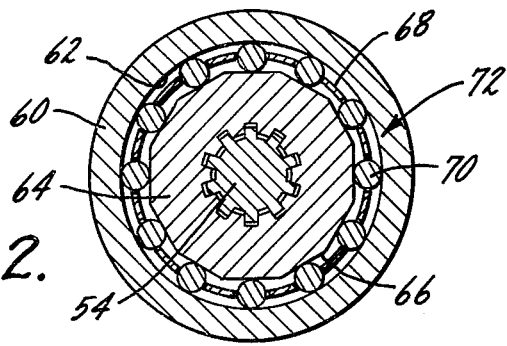
FIG. 2 is a sectional view taken along the line 2—2 of FIG. 1 showing details of the double-acting overrunning clutch.

With reference to FIG. 2, assume output shaft 52 and cam 64 are rotating in the clockwise direction. Output shaft 56 and extension 60 also are rotating in the clockwise direction, but at a slightly faster speed. The drag effect on roller cage 68 causes rollers 70, in effect, to rotate relatively in the counterclockwise direction. Rollers 70 tend to wedge between inner race 66 and outer race 62 so as to engage clutch 72. However, due to the fact that extension 60 is rotating faster than cam 64, a force is developed which acts on rollers 70 such that they will be carried in the clockwise direction, relatively, away from their engaged position. Thus, the relative rotation between extension 60 and cam 64 prevents engagement of clutch 72. As a result, torque is transferred to output shaft 52 but not to output shaft 56. In this condition, the operation is essentially that of a conventional two-wheel drive vehicle.

If the rear wheels lose traction, output shaft 52 will speed up until it is rotating at the same speed as is output shaft 56. The drag effect on roller cage 68 will cause rollers 70 to wedge between inner race 66 and outer race 62 when output shafts 52 and 56 are rotating at the same speed. When this takes place, torque will be transferred both to output shaft 52 and through clutch 72 to output shaft 56. In this condition, the operation is essentially that of a conventional four-wheel drive vehicle in locked-up mode.

When the rear wheels regain traction, output shaft 52 will slow down, and output shaft 56 will again overrun output shaft 52. Rollers 70 will be carried away from their engaged position toward a freewheeling position, thereby disengaging clutch 72 and restoring the vehicle to the two-wheel drive condition. Thus, it will be seen that the transfer case provides for establishment of four-wheel drive automatically as required, and for establishment of two-wheel drive automatically when four-wheel drive is not required. This automatic engaging and disengaging feature is provided when the vehicle is moving in either the forward or reverse directions; that is, when output shafts 52 and 56 are rotating in either the clockwise or counterclockwise directions as shown in FIG. 2.

As noted, relative rotation between extension 60 and cam 64, with extension 60 overspeeding, normally prevents clutch 72 from engaging by causing rollers 70 to move slightly, relatively, away from a wedging position on clutch races 62 and 66. This results in slight rotational displacement of cage 68 toward the central or freewheel position.

It has been determined that excessive overspeed of overrunning race 62 could pull cage 68 and rollers 70 beyond the central position into a clutch-engaging position on the opposite side of cam 64. This may occur under unusual operating conditions. For example, a tire blowout would cause the rolling radius of that wheel to become suddenly reduced. Such changes in the characteristics of a vehicle driveline would create a potentially dangerous condition. Similarly, shocks due to jerks, bumps, etc. could cause instantaneous excessive overspeed of the overrunning race sufficient to pull the rollers beyond the freewheel position to create the same potential danger.

This condition is sensitive not only to the percentage overrun of the outer race, but also to the gross vehicle speed. Certrifugal force effects on the rollers tend to drag them, and the cage, toward lock-up on the opposite side of the cam. While enough frictional drag on the cage to prevent this could be built into the system, the amount of drag required would be wasteful of power and could lead to excessive wear under normal operating conditions.

Initial vehicle movement causes cage 68 to be displaced initially from its central position due to the frictional drag effect. Displacement of cage 68 upwardly, for example, as shown in FIG. 4, would cause fingers 74 to clear tabs 82. As a result, tabs 82 would move upwardly, as shown in FIGS. 1 and 3, under the influence of centrifugal force, into a position blocking return displacement of cage 68 to its central position. This condition would obtain so long as operation of the system develops the requisite centrifugal force. In this condition, rollers 70 are free to move between one engaged position and a disengaged position, but are blocked from moving over the central position to the opposite engaged position. Of course, tabs 84 would perform a similar blocking function if initial displacement of cage 68 were downward, as shown in FIG. 4.

As the vehicle slows down, reduced centrifugal force is overcome by tabs 82 and 84, as the case may be, and they would retract downwardly, as shown in FIGS. 1 and 3, restoring plate 80 to substantially its original condition, and thus unblocking fingers 74. Cage 68 again would be free to move under the influence of the frictional drag effect, as noted above.

The simplicity of this mechanism is apparent. It will be seen that a transfer case has been provided which normally drives one output shaft to provide conventional two-wheel drive of an associated vehicle. When required, a double-acting overrunning clutch engages automatically to provide drive to both output shafts so as to establish four-wheel drive. When four-wheel drive is no longer required, the clutch automatically disengages and the system reverts to conventional two-wheel drive. The clutch includes a blocking device which acts automatically to prevent undesirable clutch lock-up.

It is anticipated that high speed-low torque or low speed-high torque drives may be established when suitable reduction gearing is provided.

It should be understood that while a preferred embodiment of the invention has been shown and described, this is illustrative and may be modified by those skilled in the art without departing from the scope thereof, which is to be limited only by the claims herein.

I claim:

1. A torque transfer assembly comprising a housing, an input shaft supported for rotation in said housing, first and second output shafts supported for rotation in said housing, and means coupling said input shaft with said output shafts for transfer of torque thereto, said coupling means including an overrunning clutch having wedging means movable between two clutch engaging positions wherein torque is transferred to said second output shaft and a clutch disengaging position wherein torque is not transferred to said second output shaft, means biasing said wedging means toward one of said clutch engaging position in response to rotation of one of said shafts, and means responsive to centrifugal force developed upon rotation of one of said shafts for blocking movement of said wedging means to the other of said clutch engaging positions, said blocking means being movable into the path of said wedging means upon initial movement of said wedging means toward said one clutch engaging position.

2. The invention of claim 1, said wedging means and blocking means being constructed and arranged such that said initial movement of said wedging means frees said blocking means to respond to said centrifugal force.

3. The invention of claim 2, said blocking means being rotatable in response to rotation of said one shaft for developing said centrifugal force.

4. In a four-wheel drive vehicle having a transfer case for transferring rotary motion from a source of power to front and rear pairs of traction wheels, said transfer case including a housing, an input shaft and first and second output shafts supported in said housing, and means in said housing for transferring rotary motion from said input shaft to said output shafts, said transferring means coupling said input shaft with said first output shaft and including an overrunning clutch coupled with said second output shaft; the improvement wherein said clutch comprises first and second clutch races, a roller cage, a plurality of rollers carried by said cage between said clutch races for relative movement between two clutch engaging positions, means biasing said rollers toward one of said clutch engaging position upon rotation of at least one of said output shafts, rotation of said second output shaflt faster than said first output shaft tending relatively to move said rollers away from said one engaging position, and means responsive to centrifugal force developed upon rotation of said one output shaft for preventing said relative movement of said rollers to the other of said clutch engaging positions, said preventing means being movable into the path of said cage in response to said centrifugal force, whereby said rollers are blocked from said movement to said other clutch engaging position, said rollers being movable relatively between said one clutch engaging position and a clutch disengaging position when said preventing means is in the path of said cage.

5. Power transmission apparatus comprising a housing, a first element supported for rotation in said housing and defining a plurality of cam surfaces, a second element supported for rotation in said housing and defining an annular surface, an annular cage, a plurality of rollers supported by said cage and subject to rotational displacement therewith relative to said elements between a central freewheel position and two positions in which said rollers are in wedging engagement with said surfaces, means responsive to rotation of at least one of said elements relative to said housing for biasing said cage into rotational displacement toward one of said engaging positions, and means responsive to centrifugal force developed upon rotation of one of said elements for blocking rotational displacement of said cage to the other of said engaging positions, said blocking means being movable into the path of rotational displacement of said cage upon rotational displacement thereof toward said one engaging position, whereby said cage is blocked from rotational displacement to said other engaging position.

6. The invention of claim 5, said blocking means being a plate rotatable with said one element, said plate having at least one tab movable into the path of rotational displacement of said cage in response to said centrifugal force.

7. The invention of claim 6, said plate having a pair of spaced tabs, said cage overlapping said tabs in said central position thereof, rotational displacement of said cage in one direction freeing one of said tabs to respond to said centrifugal force, and rotational displacement of said cage in another direction freeing the other of said tabs to respond to said centrifugal force.

8. The invention of claim 7, wherein said first element is said one element and said cam surface is an inner race, said second element is coaxial with said first element and said annular surface is an outer race, said cage is coaxial with said elements, and said plate has at least one pair of spaced tabs parallel to the axis and underlying at least a portion of said cage, whereby said tabs tend to deflect outwardly toward the path of rotational displacement of said cage in response to said centrifugal force.

9. In a freewheel device including first and second rotatable elements, wedging means having first and second engaging positions respectively establishing clockwise and counterclockwise driving relationships between said elements, and means tending to bias said wedging means toward said first and second positions respectively upon said clockwise and counterclockwise rotation; the improvement comprising means responsive to centrifugal force developed upon said clockwise rotation for preventing said engagement in said second position and responsive to centrifugal force developed upon said counterclockwise rotation for preventing said engagement in said first position.

* * * * *

UNITED STATES PATENT OFFICE
CERTIFICATE OF CORRECTION

PATENT NO. : 4,044,870
DATED : August 30, 1977
INVENTOR(S) : Mark John Fogelberg It is certified that error appears in the above-identified patent and that said Letters Patent are hereby corrected as shown below:

Column 5, line 27, change "tabs 82 and 84" to
-- tabs 82 or 84 --.

Column 6, line 27, cancel "shaflt" and insert
-- shaft --.

Signed and Sealed this

Twenty-second Day of November 1977

[SEAL]

Attest:

RUTH C. MASON
Attesting Officer

LUTRELLE F. PARKER
Acting Commissioner of Patents and Trademarks